Figure 1:
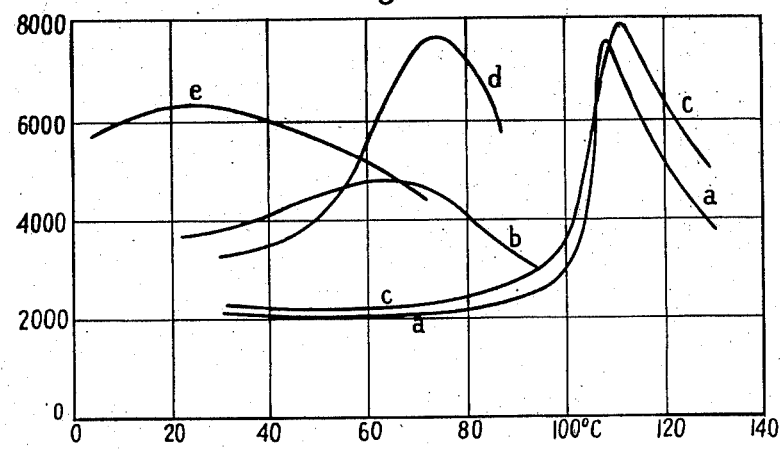

Dec. 22, 1959  K. W. PLESSNER ET AL  2,918,381
CERAMIC DIELECTRIC MATERIALS

Filed May 8, 1956  2 Sheets-Sheet 1

Inventors
*Karl Wolfgang Plessner &
Roger West*
By
Attorneys

Dec. 22, 1959  K. W. PLESSNER ET AL  2,918,381
CERAMIC DIELECTRIC MATERIALS

Filed May 8, 1956  2 Sheets-Sheet 2

Inventors
Karl Wolfgang Plessner &
Roger West
By
Hoopes, Leonard & Buell
their Attorneys

United States Patent Office 2,918,381
Patented Dec. 22, 1959

2,918,381

CERAMIC DIELECTRIC MATERIALS

Karl Wolfgang Plessner and Roger West, Middlesex, England, assignors to British Dielectric Research Limited, London, England, a British company Application May 8, 1956, Serial No. 583,498

Claims priority, application Great Britain May 24, 1955

13 Claims. (Cl. 106—39)

Ceramic barium titanate, not containing additives deliberately introduced to alter the temperature coefficient of dielectric constant, has the property that the value of its dielectric constant rises to a high peak at about 123° C. Many methods have been proposed for flattening this peak and shifting it to a lower temperature within the normal working range of capacitors having dielectrics based on barium titanate. Among these proposals is the addition of a minor amount of calcium zirconate, the calcium zirconate forming mixed crystals with the barium titanate. It is the object of the present invention not only to flatten and shift the peak of the dielectric constant curve to a lower temperature but also to increase the electrical breakdown strength of the ceramic.

The present invention is based on the discovery that the addition of small amounts of magnesium oxide to ceramic materials containing barium titanate and calcium zirconate not only causes a further flattening of the peak of the dielectric constant curve with an increased shift to a lower temperature but also enables materials of higher density to be obtained under equivalent firing conditions (or alternatively materials of the same density to be obtained at a lower firing temperature). The electrical breakdown strength of the materials increases with increase of density and decrease of porosity.

In accordance with the invention a ceramic dielectric material comprises a fired mixture consisting of barium titanate with calcium zirconate, in an amount less than the amount of barium titanate but at least 2% by weight of the calcium zirconate plus barium titanate together, and containing an addition of up to 1% of magnesium oxide. In other words the material is one which on analysis shows as ingredients barium oxide, calcium oxide, magnesium oxide, titania and zirconia, the relationship between the barium oxide content and titania content being substantially stoichiometric for the formation of barium titanate, the relationship between the calcium oxide content and zirconia content being substantially stoichiometric for the formation of calcium zirconate (in an amount less than the amount of barium titanate and at least 2% of the weight of the calcium zirconate and barium titanate together) and the magnesium oxide content being up to 1% of the total weight of calcium oxide, zirconia, barium oxide and titania. As little as ¼% of magnesium oxide gives a useful improvement in the properties of the material. Our preferred limits are ¼% to ¾% but between these limits we prefer to use ½%.

It is well known that ceramic materials useful for the present purpose may still be obtained from the system $BaO \cdot CaO \cdot TiO_2 \cdot ZrO_2$ provided that (a) the difference between the molar ratios $$\frac{BaO}{BaO+CaO}$$

and $$\frac{TiO_2}{TiO_2+ZrO_2}$$

is between the limits ±0.05 and (b) the molar ratio $$\frac{BaO+CaO}{TiO_2+ZrO_2}$$

does not differ from unity by more than ±0.02. Although we prefer to keep the two ratios referred to in (a) equal to each other and to keep the ratio referred to in (b) equal to unity, variations between the limits specified, i.e. ±0.05 for (a) and ±0.02 for (b), are included in the scope of the present invention.

An important advantage of the present invention is that the standard manufacturing techniques at present used in the manufacture of barium titanate ceramics can be used; for example we prefer to form the ceramic material by mixing together barium carbonate, titanium oxide, calcium carbonate, zirconium oxide and magnesium oxide, pre-firing this mixture, grinding it up again and, after forming it to the desired shape, with the addition of a temporary binder if necessary, firing it at a temperature between 1300 and 1400° C.

In addition to its effect on the density of the fired ceramic, the magnesium oxide affects the temperature coefficient of the dielectric constant of the material. In a similar way to the calcium zirconate addition, it flattens the peak and shifts it to a lower temperature. The proportions of magnesium oxide and calcium zirconate added must therefore be chosen, within the limits set out in the appended claims to obtain the optimum increase in density (or decrease in firing temperature) consistent with a minimum variation of the dielectric constant over a desired temperature range. We prefer to use about ½% by weight of magnesium oxide based on the weight of all other ingredients and to adjust the calcium zirconate content to give the desired temperature coefficient of dielectric constant. Except for special applications, the calcium zirconate content will generally not rise above 20.5% by weight of the total weight of barium titanate and calcium zirconate (equivalent to 25 molar percent). For example with a ½% addition of magnesium oxide, our preferred ratio of barium titanate to calcium zirconate is 95:5 by weight, which shifts the peak to about 20° C.

Figure 2:
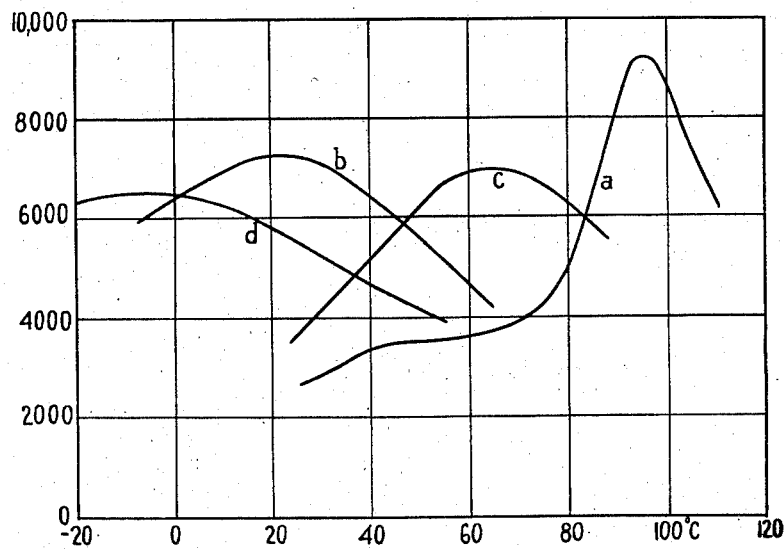
Figure 3:
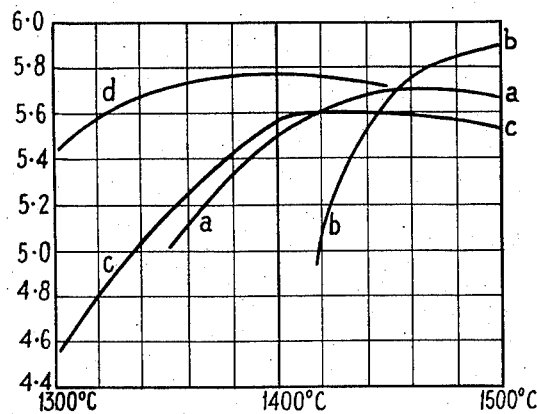
Figure 4:
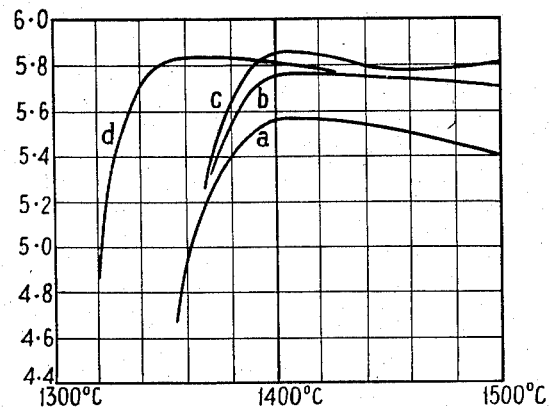
Figure 5:
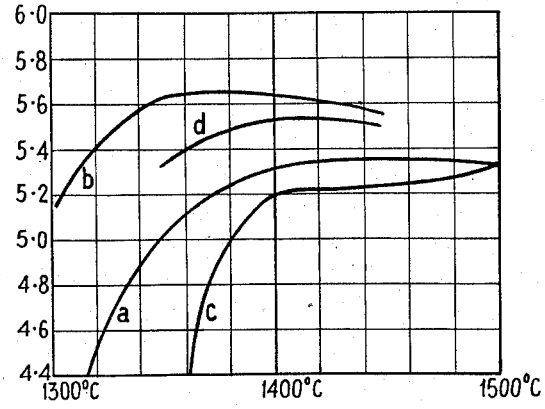

The properties of further examples of ceramic materials in accordance with the invention are shown in the accompanying drawings in which Figures 1 and 2 are graphs showing permittivity against temperature and Figures 3, 4 and 5 are graphs showing density against firing temperature for several compositions.

All of the compositions were prepared from commercial raw materials as follows:

Barium carbonate=Laport "Pure"

Titania=Kronos E Anatase supplied by British Titan Products

Calcium carbonate=British Drug Houses precipitated, and

Zirconia sold by the Titanium Alloy Division of the National Lead Co. as "C.P."

B.D.H. Analar Grade magnesium oxide was used because it appeared to be of smaller particle size than the B.D.H. "heavy" grade. The particle size of the magnesium oxide used was such that 50% by weight was finer than 4.8 microns, 20% by weight finer than 0.5 micron and 80% finer than 10 microns. It is believed that the particle size is not critical. Quantities of powder calculated to give 100 gm. after driving off carbon dioxide were mixed in a rubber-lined flint pebble mill of 750 cc. capacity, using 150 cc. of 0.1% gum arabic solution in water as the dispersing medium. The mill was run for 6 hours at 69 r.p.m., the slip filtered and the dried filter-cake calcined for 3 hours at 1120° C. After the calcination 10–15% water was added as a binder, using a pestle and mortar to incorporate the water and to break up the powder to pass a 25 mesh sieve.

Discs, ⅞" diameter and approximately 2 mm. thick, were pressed from this powder at 3 tons/sq. inch and fired at various temperatures for 3-hour soak periods. The rate of rise of temperature was approximately 130° C. per hour. The rate of cooling over the first 15 minutes varied from 2° to 10° per minute.

The discs were provided with fired-on silver electrodes and the permittivity (at 50 c./s.) was then recorded as a function of temperature. The temperature range covered was varied so as to include the permittivity peak on the record.

The apparent density of the fired discs was determined by using Archimedes principle and the apparent porosity was calculated from the ratio of the apparent density to the optimum crystal density derived from X-ray data.

Referring to the drawings, the examples of compositions for which curves are plotted are identified by the figure number followed by the letter a, b, c, etc., which is written against the curve for that composition. The compositions (in parts by weight) are as follows:

Table I

| Examples | BaTiO₃ | CaZrO₃ | MgO |
| --- | --- | --- | --- |
| 1a, 3a | 100 | | |
| 1b, 3b | 100 | | ½ |
| 1c, 4a | 98 | 2 | |
| 1d, 4b | 98 | 2 | ¼ |
| 1e, 4c | 98 | 2 | ½ |
| 2a, 3c | 95 | 5 | |
| 2b, 3d | 95 | 5 | ½ |
| 2c, 5a | 91 | 9 | |
| 2d, 5b | 91 | 9 | ½ |
| 4d | 98 | 2 | 1 |
| 5c | 87.5 | 12.5 | |
| 5d | 87.5 | 12.5 | ½ |

In each case the figure given for magnesium oxide and the figure given for calcium zirconate is a percentage of the total content of barium titanate plus calcium zirconate.

The following are the densities and apparent porosities at stated firing temperatures of the compositions set out in Table I:

Table II

| Examples | Firing temperature, °C | Density | Apparent Porosity, Percent |
| --- | --- | --- | --- |
| 1a, 3a | 1,450 | 5.76 | 4.5 |
| 1b, 3b | 1,500 | 5.87 | 1.9 |
| 1c, 4a | 1,400 | 5.56 | 7.2 |
| 1d, 4b | 1,400 | 5.78 | 3.2 |
| 1e, 4c | 1,400 | 5.87 | 1.2 |
| 2a, 3c | 1,400 | 5.60 | 5.5 |
| 2b, 3d | 1,400 | 5.76 | 2.0 |
| 2c, 5a | 1,400 | 5.40 | 7.5 |
| 2d, 5b | 1,350 | 5.64 | 2.5 |
| 4d | 1,350 | 5.84 | 0.8 |
| 5c | 1,500 | 5.34 | 7.4 |
| 5d | 1,400 | 5.54 | 3.0 |

In Figures 1 and 2 the measurements were taken with the temperature rising from the lowest value recorded. From Figure 1 it will be seen from curve b that magnesium oxide when added alone shifts the peak towards lower temperatures and that when ¼% of magnesium oxide is used in conjunction with 2% of calcium zirconate (curve d) although some flattening and shift of the peak is caused it is less than with ½% of magnesium oxide alone. A better effect is obtained by the use of ½% magnesium oxide with 2% calcium zirconate (curve e).

Figure 2 shows the effect of larger amounts of calcium zirconate alone and with ½% of magnesium oxide. Curve c shows that 9% of calcium zirconate when used alone shifts the peak to about 65° C. Curves b and d show that by varying from 5% to 9% the amount of calcium zirconate used in conjunction with ½% magnesium oxide, materials having a maximum permittivity between about 20° C. and 0° C. can be obtained.

From Figure 3 (c and d) it will be seen that the addition of ½% of magnesium oxide to a composition containing 5% of calcium zirconate increases the density when fired at 1300° C. from 4.47 to 5.42, i.e. by 21%. This is our preferred composition since it gives the optimum increase in density with a minimum variation of dielectric constant over a working range of 20° to 50° C. (see curve 2b).

From Figure 4 and Table II it will be seen that the addition of ½% of magnesium oxide to a composition containing 98% of barium titanate and 2% of calcium zirconate results in an increase in density of the material, when fired at 1400° C., of from 5.56 to 5.87 corresponding to a decrease in porosity from 7.2% to 1.2%. Greater increases in density are obtained at lower firing temperatures.

Figure 5 shows that similar effects are obtained when larger amounts of calcium zirconate are used.

From Figure 3 it will be seen that, surprisingly, whereas an addition of magnesium oxide alone to barium titanate (b) decreases the density at lower temperatures and an addition of calcium zirconate alone (c) causes little change in density at lower firing temperatures a very marked increase in density at firing temperatures of 1300° C. to 1400° C. is obtained by the addition of both magnesium oxide and calcium zirconate (d).

In the following claims the expression "materials which on firing yield barium oxide, titania, etc." is intended to include the oxides per se.

What we claim as our invention is:

1. A barium titanate ceramic dielectric material consisting essentially of barium oxide, calcium oxide, magnesium oxide, titania and zirconia, the relationship between the barium oxide content and titania content being substantially stoichiometric for the formation of barium titanate, the relationship between the calcium oxide content and zirconia content being substantially stoichiometric for the formation of calcium zirconate in an amount less than the amount of barium titanate and at least 2% by weight of the barium titanate and calcium zirconate together, and the magnesium oxide content being ¼%–1% of the total weight of calcium oxide, zirconia, barium oxide and titania.

2. A ceramic material in accordance with claim 1 in which the relationship between the barium oxide and titanium dioxide content is varied from stoichiometric to the extent that the excess of one of these constituents is sufficient to form a molar percentage not greater than 5 of one compound selected from the group consisting of calcium titanate and barium zirconate the ratio of $(BaO+CaO):(ZrO_2+TiO_2)$ being within the limits 0.98:1 and 1.02:1.

3. A barium titanate ceramic dielectric material consisting essentially of barium oxide, calcium oxide, magnesium oxide, titania and zirconia, the relationship between the barium oxide content and titania content being substantially stoichiometric for the formation of barium titanate, the relationship between the calcium oxide content and zirconia content being substantially stoichiometric for the formation of calcium zirconate in an amount from 2% to 20.5% of the amount of barium titanate and calcium zirconate, and the magnesium oxide content being ¼ to 1% of the total weight of calcium oxide, zirconia, barium oxide and titania.

4. A ceramic material in accordance with claim 3 in which the relationship between the barium oxide and titanium dioxide content is varied from stoichiometric to the extent that the excess of one of these constituents is sufficient to form a molar percentage not greater than 5 of one compound selected from the group consisting of calcium titanate and barium zirconate the ratio of $(BaO+CaO):(ZrO_2+TiO_2)$ being within the limits 0.98:1 and 1.02:1.

5. A barium titanate ceramic dielectric material consisting essentially of barium oxide, calcium oxide, magnesium oxide, titania and zirconia, the relationship between the barium oxide content and titania content being substantially stoichiometric for the formation of barium titanate, the relationship between the calcium oxide content and zirconia content being substantially stoichiometric for the formation of calcium zirconate in an amount less than the amount of barium titanate and at least 2% by weight of the barium titanate and calcium zirconate together, and the magnesium oxide content being ½% of the total weight of calcium oxide, zirconia, barium oxide and titania.

6. A method of manufacturing a barium titanate ceramic dielectric material which comprises mixing together materials which on prefiring consists essentially of barium oxide, titania, calcium oxide, zirconium oxide and magnesium oxide, prefiring this mixture, grinding the prefired mixture, shaping it and firing it to form a ceramic material, the amounts of the ingredients used being such as to form barium titanate, calcium zirconate in an amount less than the amount of barium titanate but at least 2% by weight of the barium titanate and calcium zirconate together and ¼%–1% of magnesium oxide based on the total weight of barium titanate and calcium zirconate.

7. A method in accordance with claim 6 in which the relationship between the barium oxide and titanium dioxide content is varied from stoichiometric to the extent that the excess of one of these constituents is sufficient to form a molar percentage not greater than 5 of one compound selected from the group consisting of calcium titanate and barium zirconate the ratio of (barium oxide+calcium oxide):(zirconia+titania) being within the limits 0.98:1 and 1.02:1.

8. A method of manufacturing a barium titanate ceramic dielectric material which comprises mixing together materials which on prefiring consists essentially of barium oxide, titania, calcium oxide, zirconium oxide and magnesium oxide, prefiring this mixture, grinding the prefired mixture, shaping it and firing it to form a ceramic material, the amounts of the ingredients used being such as to form barium titanate, 2% to 20.5% of calcium zirconate based on the weight of barium titanate and calcium zirconate and ¼% to 1% of magnesium oxide based on the total weight of barium titanate and calcium zirconate.

9. A method in accordance with claim 8 in which the relationship between the barium oxide and titanium dioxide content is varied from stoichiometric to the extent that the excess of one of these constituents is sufficient to form a molar percentage not greater than 5 of one compound selected from the group consisting of calcium titanate and barium zirconate the ratio of (barium oxide+calcium oxide):(zirconia+titania) being within the limits 0.98:1 and 1.02:1.

10. A method of manufacturing a barium titanate ceramic dielectric material which comprises mixing together materials which on prefiring consists essentially of barium oxide, titania, calcium oxide, zirconium oxide and magnesium oxide, prefiring this mixture, grinding the prefired mixture, shaping it and firing it to form a ceramic material, the amounts of the ingredients used being such as to form barium titanate, 2% to 20.5% calcium zirconate and ½% of magnesium oxide based on the total weight of barium titanate and calcium zirconate.

11. A barium titanate ceramic dielectric material consisting essentially of calcium zirconate in an amount less than the amount of barium titanate but at least 2% by weight of the barium titanate and calcium zirconate together and ¼%–1% of magnesium oxide based on the total weight of barium titanate and calcium zirconate.

12. A barium titanate ceramic dielectric material consisting essentially of 2% to 20.5% by weight of calcium zirconate based on the weight of barium titanate and calcium zirconate and ¼% to 1% magnesium oxide based on the total weight of barium titanate and calcium zirconate.

13. A barium titanate ceramic dielectric material consisting essentially of 2–20.5% of calcium zirconate and ½% of magnesium oxide based on the total weight of barium titanate and calcium zirconate.

References Cited in the file of this patent

UNITED STATES PATENTS

| | | |
|---|---|---|
| 2,402,516 | Wainer | June 18, 1946 |
| 2,402,517 | Wainer | June 18, 1946 |
| 2,643,192 | Jonker et al. | June 23, 1953 |